United States Patent
Diemer et al.

(10) Patent No.: US 8,371,984 B2
(45) Date of Patent: Feb. 12, 2013

(54) MULTI-SPEED TRANSMISSION HAVING AUTOMATIC AND MANUAL MODES

(75) Inventors: Larry D. Diemer, Clarkston, MI (US); Farzad Samie, Franklin, MI (US); Chunhao J. Lee, Troy, MI (US); David W. Wright, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 215 days.

(21) Appl. No.: 12/884,969

(22) Filed: Sep. 17, 2010

(65) Prior Publication Data
US 2012/0071292 A1   Mar. 22, 2012

(51) Int. Cl.
*F16H 3/44* (2006.01)
(52) U.S. Cl. .................................... 475/289; 475/312
(58) Field of Classification Search .................. 475/289, 475/312
See application file for complete search history.

(56) References Cited

U.S. PATENT DOCUMENTS

| 7,699,741 | B2 | 4/2010 | Hart et al. | |
| 8,029,403 | B2 * | 10/2011 | Lee et al. | 475/276 |
| 2008/0207381 | A1 | 8/2008 | Wittkopp et al. | |
| 2009/0280941 | A1 | 11/2009 | Dusenberry et al. | |
| 2010/0063693 | A1 | 3/2010 | Lee et al. | |
| 2012/0071291 | A1 * | 3/2012 | Diemer et al. | 475/297 |

* cited by examiner

*Primary Examiner* — David D Le
*Assistant Examiner* — Derek D Knight (57) ABSTRACT

A transmission is provided having a stationary member, an input member, an output member, four planetary gear sets, a plurality of coupling members and five torque transmitting devices. Each of the planetary gear sets includes first, second and third members. The five torque transmitting mechanisms are selectively engageable to interconnect one of the first, second, and third members with another of the first, second, third members, and a stationary element. The torque transmitting mechanisms are selectively engageable in combinations of at least three to establish at least eight forward speed ratios and at least one reverse speed ratio between the input member and the output member. A first of the five torque-transmitting mechanisms is a selectable one-way clutch engageable to interconnect the third member of the fourth planetary gear set with the stationary member.

20 Claims, 4 Drawing Sheets

|     | 34 | 32  |   | 28 | 30 | 26 |
|-----|----|-----|---|----|----|----|
|     |    | A   | M |    |    |    |
| R   | X  | L   |   |    | X  |    |
| N   |    | O   |   |    |    |    |
| 1ST | X  | U   | L | X  |    |    |
| 2ND | X  | U   | L |    |    | X  |
| 3RD |    | U   | L | X  |    | X  |
| 4TH |    | U   | L |    | X  | X  |
| 5TH |    | U   | L | X  | X  |    |
| 6TH |    | U   |   | X  | X  | X  |
| 7TH | X  | U   |   | X  | X  |    |
| 8TH | X  | U   |   |    | X  | X  |

MULTI-SPEED TRANSMISSION HAVING AUTOMATIC AND MANUAL MODES

FIELD

The present disclosure relates to a multi-speed transmission having both a plurality of planetary gear sets and torque transmitting devices that are selectively engageable to achieve multiple gear ratios.

BACKGROUND

The statements in this section merely provide background information related to the present disclosure and may or may not constitute prior art.

A multi-speed transmission uses a combination of clutches, planetary gear arrangements, and fixed interconnections to achieve a plurality of gear ratios. In one example, friction type clutches are used in the transmission, and are selectively engaged to achieve a particular gear ratio. However, when disengaged, the friction clutches tend to produce drag when there is relative motion between the clutch input member and output member, which can lead to decreased fuel economy.

In an effort to improve fuel economy, a one-way clutch may be employed instead of a friction clutch to transmit power from a first input member to a second driven member. The one-way clutch transmits torque in a first direction and releases or decouples in a second, opposite direction. Once released, the driving member is free to rotate in the second opposite direction relative to the first direction, and the one-way clutch can overrun or freewheel. This allows the vehicle to travel in a coasting or gliding mode where the drivetrain is decoupled from the engine, thus eliminating any losses associated with the drivetrain turning the engine.

Engine braking occurs when torque to the driving member is reduced, the driving member and the driven member remained coupled to one another, and back torque as a result of turning the engine with reduced power and pumping forces is transmitted in an effort to reduce the speed of the driven member. However, freewheeling the one-way clutch decouples the driven and the driving member, thereby making engine braking not possible. Thus, engine braking in a vehicle operated with a one-way clutch will not work unless additional components are included, such as an additional clutch to selectively couple the driving member and the driven member.

Thus, while current transmissions achieve their intended purpose, there is a need for a new and improved transmission which exhibits improved performance while allowing engine braking.

SUMMARY

The present invention provides a transmission having a housing with a front wall and a rear wall, an input member adjacent the front wall, and an output member adjacent the rear wall. First, second, third and fourth planetary gear sets are provided, where each gearset has a first, second and third member. The second planetary gearset is adjacent the front wall, the fourth planetary gear set is adjacent the rear wall, the third planetary gear set is located between the second planetary gear set and the fourth planetary gear set, and the first planetary gear set is located between the third planetary gear set and the fourth planetary gear set. A first interconnecting member continuously interconnects the first member of the first planetary gear set with the first member of the fourth planetary gear set. A second interconnecting member continuously interconnects the third member of the first planetary gear set with the first member of the second planetary gear set. A third interconnecting member continuously interconnects the third member of the second planetary gear set with the first member of the third planetary gear set. A fourth interconnecting member continuously interconnects the third member of the third planetary gear set with the second member of the fourth planetary gear set. Five torque transmitting mechanisms are selectively engageable to interconnect one of the first, second, and third members with another of the first, second, third members, and a stationary element. The torque transmitting mechanisms are selectively engageable in combinations of at least three to establish at least eight forward speed ratios and at least one reverse speed ratio between the input member and the output member. A first of the five torque-transmitting mechanisms is a selectable one-way clutch engageable to interconnect the third member of the fourth planetary gear set with the stationary member.

In an embodiment of the present invention, a second of the five torque transmitting mechanisms is selectively engageable to interconnect the first member of the second planetary gear set with at least one of the third member of the second planetary gear set and the first member of the third planetary gear set.

In another embodiment of the present invention, a third of the five torque transmitting mechanisms is selectively engageable to interconnect at least one of the second member of the first planetary gear set and the input member with at least one of the third member of the second planetary gear set and the first member of the third planetary gear set.

In yet another embodiment of the present invention, a fourth of the five torque transmitting mechanisms is selectively engageable to interconnect the second member of the second planetary gear set with the second member of the third planetary gear set.

In an embodiment of the present invention, a fifth of the five torque transmitting mechanisms is selectively engageable to interconnect at least one of the first member of the fourth planetary gear set and the first member of the first planetary gear set with the stationary element.

In another embodiment of the present invention, the input member is continuously interconnected with the second member of the first planetary gear set. The output member is continuously interconnected with the second member of the third planetary gear set.

In yet another embodiment of the present invention, the first members are sun gears, the second members are carrier members, and the third members are ring gears.

In an embodiment of the present invention, the selectable one-way clutch includes four modes of operation.

In another embodiment of the present invention, the transmission is operable in an automatic mode or a manual mode.

In yet another embodiment of the present invention, the selectable one-way clutch is operable in each of a locked position and an unlocked position. The locked position prevents relative rotation between the third member of the fourth planetary gear set and the stationary member. The unlocked position allows for relative rotation in a first rotary direction and prevents relative rotation in a second rotary direction between the third member of the fourth planetary gear set and the stationary member.

In an embodiment of the present invention, the locked position is selected when the transmission is operating in at least one of the automatic and manual modes, and is engaged in the reverse speed ratio. The locked position is also selected when the transmission is operating in manual mode and the transmission is engaged in one of the first, second, third, fourth and fifth speed ratios.

In another embodiment of the present invention, the unlocked position is selected when the transmission is operating in automatic mode and the transmission is engaged in one of the eight forward speed ratios.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

At the outset, it should be appreciated that the eight speed automatic transmission of the present invention has an arrangement of permanent mechanical connections between the elements of the four planetary gear sets in common. These mechanical connections generically link or relate transmission embodiments. A first component or element of a first planetary gear set is permanently coupled to a first component or element of a second planetary gear set. A second component or element of the second planetary gear set is permanently coupled to a second component or element of a third planetary gear set. A first component or element of the third planetary gear set is permanently coupled to a first component or element of a fourth planetary gear set. Finally, a second component or element of the first planetary gear set is permanently coupled to a second component or element of the fourth planetary gear set.

Figure 1:
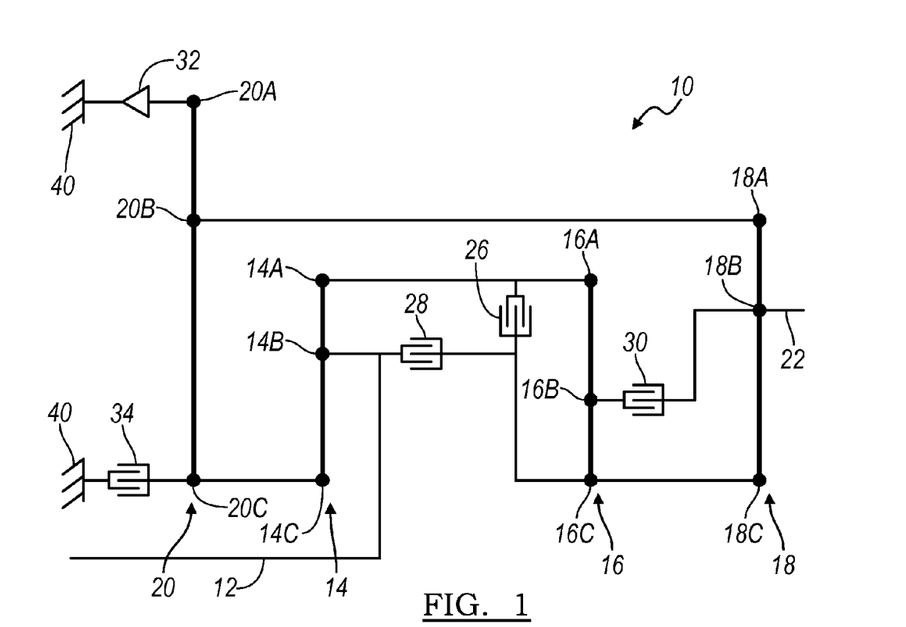
FIG. 1 is a lever diagram of an example of the transmission in accordance with the present invention.

Referring now to FIG. 1, an embodiment of an eight speed transmission 10 is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14 having three nodes: a first node 14A, a second node 14B and a third node 14C, a second planetary gear set 16 having three nodes: a first node 16A, a second node 16B and a third node 16C, a third planetary gear set 18 having three nodes: a first node 18A, a second node 18B and a third node 18C, a fourth planetary gear set 20 having three nodes: a first node 20A, a second node 20B and a third node 20C and an output shaft or member 22.

The input 12 is coupled to the second node 14B of the first planetary gear set 14. The output 22 is coupled to the second node 18B of the third planetary gear set 18. The first node 14A of the first planetary gear set 14 is coupled to the first node 16A of the second planetary gear set 16. The third node 14C of the first planetary gear set 14 is coupled to the third node 20C of the fourth planetary gear set 20. The third node 16C of the second planetary gear set 16 is coupled to the third node 18C of the third planetary gear set 18. The first node 18A of the third planetary gear set 18 is coupled to the second node 20B of the fourth planetary gear set 20.

A first clutch 26 selectively connects the first node 14A of the first planetary gear set 14 and the first node 16A of the second planetary gear set 16 to the third node 16C of the second planetary gear set 16. A second clutch 28 selectively connects the second node 14B of the first planetary gear set 14 to the third node 16C of the second planetary gear set 16. A third clutch 30 selectively connects the second node 16B of the second planetary gear set 16 to the second node 18B of the third planetary gear set 18. A first brake 32 selectively connects the first node 20A of the fourth planetary gear set 20 to a ground, stationary element, or a transmission housing 40. A second brake 34 selectively connects the third node 20C of the fourth planetary gear set 20 to a ground, stationary element, or the transmission housing 40. In the embodiment as shown, the first clutch 26, the second clutch 28, the third clutch 30, and the brake 34 are each friction-type clutches, and the brake 32 is a selectable one-way clutch.

Figure 2:
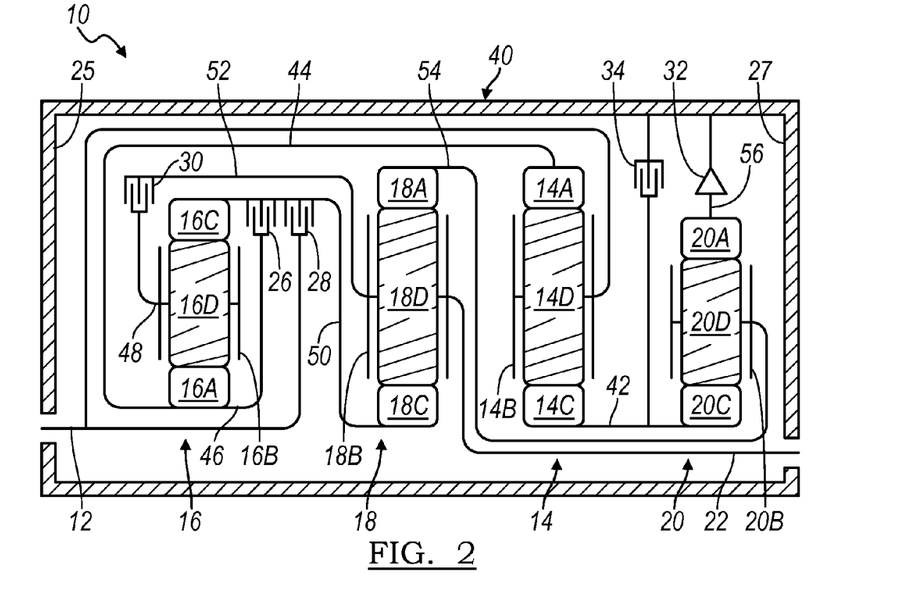
FIG. 2 is a schematic representation of an example of a transmission shown in FIG. 1 in accordance with the present invention.

Referring now to FIG. 2, a stick diagram presents a schematic layout of the embodiment of the eight speed transmission 10 according to the present invention. In FIG. 2, the numbering from the lever diagram of FIG. 1 is carried over. The clutches, brakes and couplings are correspondingly presented whereas the nodes of the planetary gear sets now appear as components of planetary gear sets such as sun gears, ring gears, planet gears and planet gear carriers.

The planetary gear sets 14, 16, 18 and 20 are connected between the input member 12 and the output member 22 and are positioned within the transmission housing 40. The housing 40 is shown schematically in FIG. 2, however those skilled in the art will appreciate that the housing 40 may have a different configuration depending on the particular vehicle application. Further, the transmission housing 40 has a front wall 25 and a rear wall 27. In the embodiment as shown, the planetary gear set 16 is positioned adjacent the front wall 25, the planetary gear set 20 is positioned adjacent the rear wall 27 and the planetary gear sets 14 and 18 are positioned between planetary gear sets 16 and 20. Specifically, the planetary gear set 14 is disposed adjacent the planetary gear set 20 and the planetary gear set 18 is disposed between the planetary gear set 14 and the planetary gear set 16. In the embodiment as shown, the front wall 25 of the transmission 10 is defined as the wall of the transmission housing 40 that supports or is adjacent to the input member 12 and the rear wall 27 of the transmission 10 is the wall of the transmission housing 40 that supports or is adjacent to the output member 22.

The first planetary gear set 14 includes a sun gear member 14C, a planet gear carrier member 14B that rotatably supports a set of planet gears 14D, and a ring gear member 14A. The planet gears 14D are each configured to intermesh with both the sun gear member 14C and the ring gear member 14A. The sun gear member 14C is connected for common rotation with a first shaft or interconnecting member 42. The planet gear carrier member 14B is connected for common rotation with the input member 12. The ring gear member 14A is connected for common rotation with a second shaft or interconnecting member 44.

The second planetary gear set 16 includes a sun gear member 16A, a planet carrier member 16B that rotatably supports a set of intermeshing planet gears 16D, and a ring gear member 16C. The planet gears 16D are configured to intermesh with the sun gear member 16A and the ring gear member 16C. The sun gear member 16A is connected for common rotation with the second interconnecting member 44 and with a third shaft or interconnecting member 46. The planet carrier member 16B is connected for common rotation with a fourth shaft or interconnecting member 48. The ring gear member 16C is connected for common rotation with a fifth shaft or interconnecting member 50.

The third planetary gear set 18 includes a sun gear member 18C, a planet carrier member 18B that rotatably supports a set of planet gears 18D, and a ring gear member 18A. The planet gears 18D are each configured to intermesh with both the sun gear member 18C and the ring gear member 18A. The sun gear member 18C is connected for common rotation with the fifth interconnecting member 50. The planet carrier member 18B is connected for common rotation with a sixth shaft or interconnecting member 52 and with the output member 22. The ring gear member 18A is connected for common rotation with a seventh shaft or interconnecting member 54.

The fourth planetary gear set 20 includes a sun gear member 20C, a planet carrier member 20B that rotatably supports a set of planet gears 20D, and a ring gear member 20A. The planet gears 20D are each configured to intermesh with both the sun gear member 20C and the ring gear member 20A. The sun gear member 20C is connected for common rotation with the first interconnecting member 42. The planet carrier member 20B is connected for common rotation with the seventh interconnecting member 54. The ring gear member 20A is connected for common rotation with an eighth shaft or interconnecting member 56.

The input shaft or member 12 is preferably continuously connected to an engine (not shown) or to a turbine of a torque converter (not shown). The output shaft or member 22 is preferably continuously connected with a final drive unit or transfer case (not shown).

The torque-transmitting mechanisms or clutches 26, 28, 30, the selectable one-way clutch 32, and the brake 34 allow for selective interconnection of the shafts or interconnecting members, members of the planetary gear sets and the transmission housing 40. As shown in FIG. 2, the first clutch 26 and the second clutch 28 are disposed between the second and third planetary gear sets 16 and 18. The third clutch 30 is disposed between the front wall 25 and the second planetary gear set 16. The first and second brakes 32 and 34 are disposed radially outboard of the first and fourth planetary gear sets 14 and 20. The first clutch 26 is selectively engageable to connect the third interconnecting member to the fifth interconnecting member 50. The second clutch 28 is selectively engageable to connect the input member 12 to the fifth interconnecting member 50. The third clutch 30 is engageable to connect the fourth interconnecting member 48 to the sixth interconnecting member 52. The selectable one-way clutch 32 is engageable to connect the eighth interconnecting member 56 to ground or the transmission housing 40 in order to selectively restrict rotation of the ring gear 20A relative to the ground or the transmission housing 40. The second brake 34 is selectively engageable to connect the first interconnecting member 42 to the ground or the transmission housing 40 to restrict rotation of the sun gear 20C and the sun gear 14C relative to the ground or the transmission housing 40.

Figure 3:
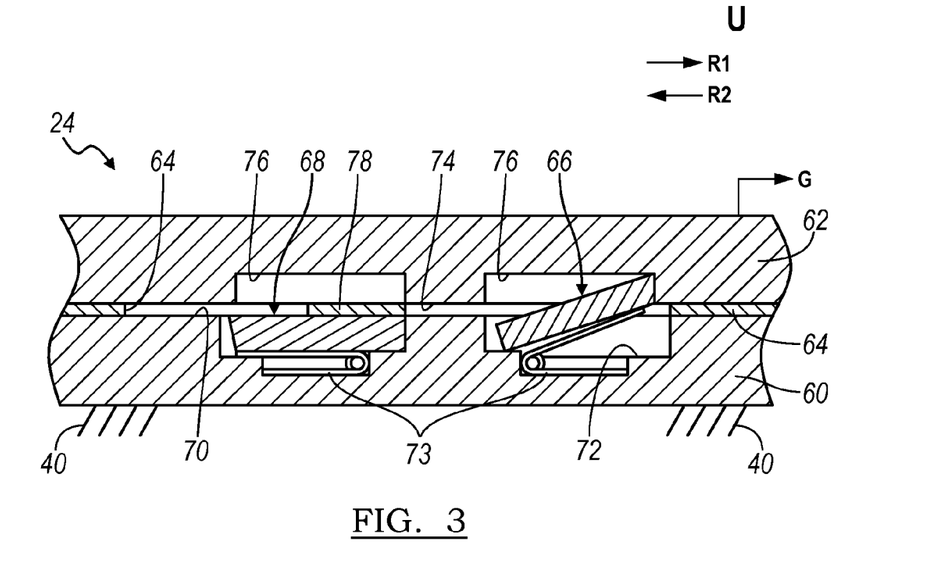
FIG. 3 is a cross section of a selectable one-way clutch in an activated or unlocked position in accordance with the present invention.
Figure 4:
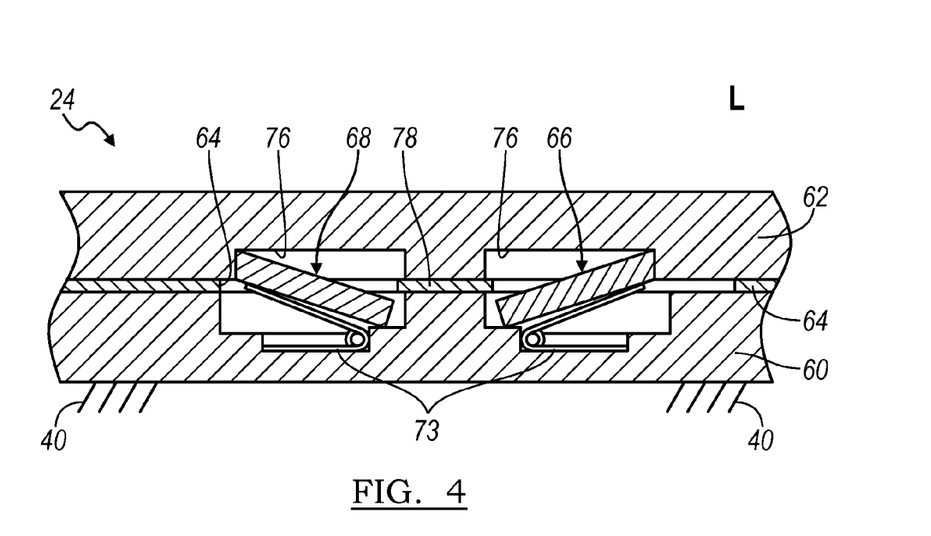
FIG. 4 is a cross section of a selectable one-way clutch in a deactivated or locked position in accordance with the present invention.

Referring now to FIGS. 3-4, two cross sectioned views of the selectable one-way clutch 32 are shown in an activated or unlocked position U (FIG. 3) and a deactivated or unlocked position L (FIG. 4). In the embodiment as shown, the selectable one-way clutch 32 is a strut-type selectable one-way clutch having a plurality of forward and reverse struts that are locking mechanisms used to provide a mechanical connection between rotating members. However, those skilled in the art will appreciate that other types of selectable one-way clutches employing other types of locking mechanisms may be used as well. Several examples of selectable one-way clutches that may be used are described in SAE Paper No. SAE-2009-01-0509, which is herein incorporated by reference in its entirety. The selectable one-way clutch 32 includes an input disc or member 60, an output disc or member 62, a selection disc or member 64, a selection disc actuator (not shown), a forward locking mechanism 66 and a reverse locking mechanism 68. As previously stated when describing FIG. 2, the selectable one-way clutch 32 is engageable to connect the eighth interconnecting member 56 to ground or the transmission housing 40 (FIG. 2). Referring now to FIGS. 2-4, the input member 60 is connected to the transmission housing 40, and the output member 62 is rotationally connected to the eight interconnecting member 56. The selection disc 64 is disposed between the input and output discs 60, 62 and remains stationary relative to the input disc 60 except when activated by the selection disc actuator (not shown).

The input member 60 has a surface 70 that includes a plurality of recesses 72. One of the forward and reverse locking mechanisms 66, 68 is mounted in a corresponding recess 72. The output member 62 has a surface 74 opposing the first surface 70 of the input member 60. The surface 72 includes recesses 76 for receiving and engaging the locking mechanisms 66, 68. Referring to FIG. 4, when each of the locking mechanisms 66, 68 are in the locked position L, the locking mechanisms 66, 68 engage with the recesses 76 of the output member 62, thus preventing relative rotation between the input member 60 and the output member 62. This in turn substantially prevents relative rotation between the eighth interconnecting member 56 with the ground or transmission housing 40 (FIG. 2).

Referring now to FIG. 3, the selection disc 64 includes an actuation feature 78 that when activated rotates over the reverse locking mechanism 68, thus preventing the reverse locking mechanism 68 from engaging with one of the recesses 76 of the output member 62. A biasing member such as a spring 73 is in contact with both the locking mechanisms

66, 68. As seen in both FIGS. 3-4, the spring 73 is used to urge the reverse locking mechanism 68 out of the corresponding recess 72 and into the locked position L. Upon activation of the selection disc 64 into the unlocked position U, the selectable one-way clutch 24 operates in the same manner as a traditional one-way clutch. That is, the selectable one-way clutch 32 allows for relative rotation between the input and output members 60, 62 in a first rotary direction R1, and prevents relative rotation between the input and output members 60, 62 in a second rotary direction R2. Thus, when in the unlocked position U, the selective one-way clutch 32 allows for relative rotation in the first rotary direction R1 between the ring gear member 20A of the fourth planetary gear set 20 and the transmission housing 40. However, relative rotation between the ring gear member 20A of the fourth planetary gear set 20 and the stationary member or transmission housing 40 is prevented in the second rotary direction R2.

Figure 6:
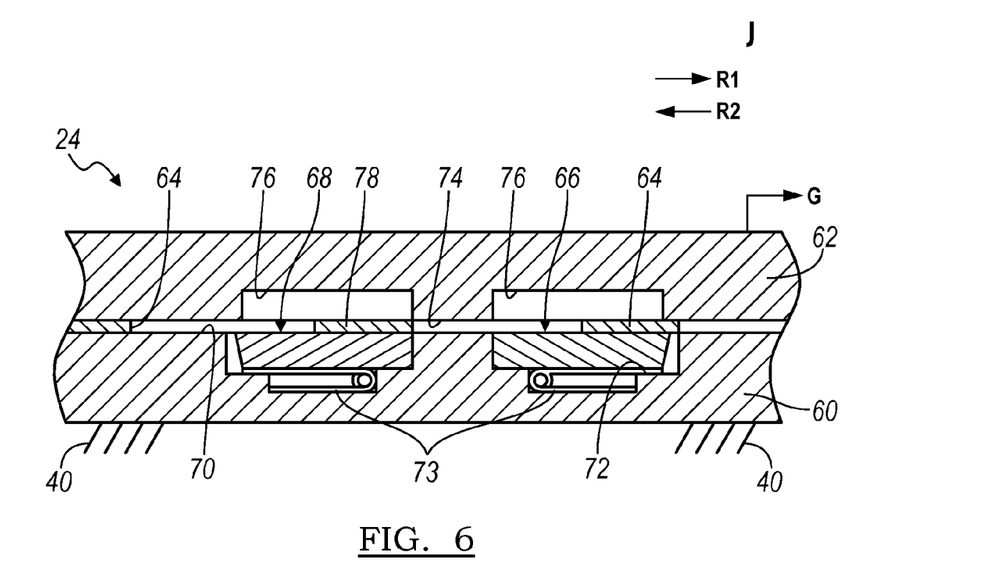
FIG. 6 is a cross section of a selectable one-way clutch in an open position in accordance with the present invention.
Figure 7:
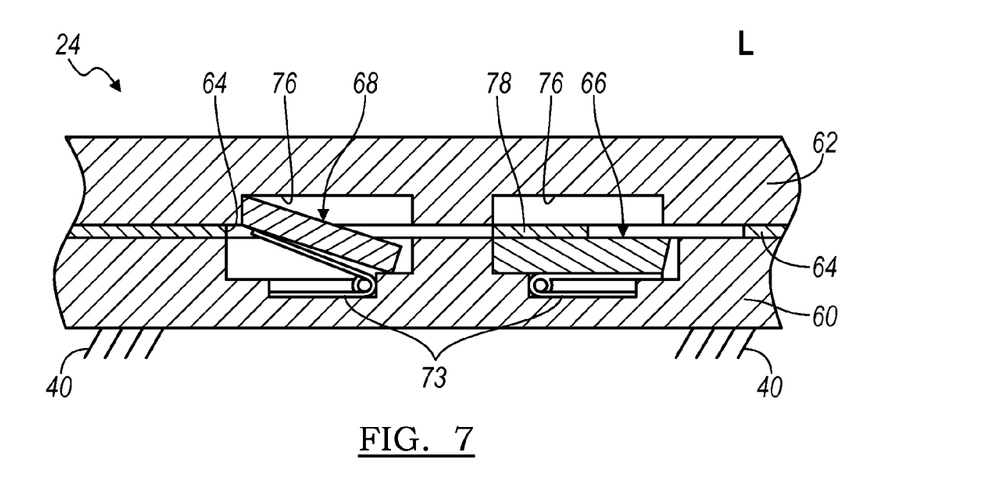
FIG. 7 is a cross section of a selectable one-way clutch in an open position in accordance with the present invention.

It should be noted that the selectable one-way clutch 32 can include up to four modes of operation. For example, the selectable one-way clutch 32 may also include an open position 0. In the open position as shown in FIG. 6, both the locking mechanisms 66 and 68 are depressed into their respective recesses 72 located in the input member 60. The selectable one-way clutch 32 may also include another unlocked position as well. In this position as shown in FIG. 7, the actuation feature 78 rotates over the forward locking mechanism 66, thus preventing the forward locking mechanism 66 from engaging with one of the recesses 76 of the output member 62, while the reverse locking mechanism 68 engages with the corresponding recess 76 in the output member. Thus, the selectable one-way clutch 32 could have up to four modes of operation, the open position 0, the unlocked position where the reverse locking mechanism 68 is engaged with the corresponding recess 76 in the output member, the unlocked position illustrated in FIG. 3 where the forward locking mechanism 66 is engaged with the corresponding recess 76 in the output member, and the locked position L as illustrated in FIG. 4.

Figure 5:
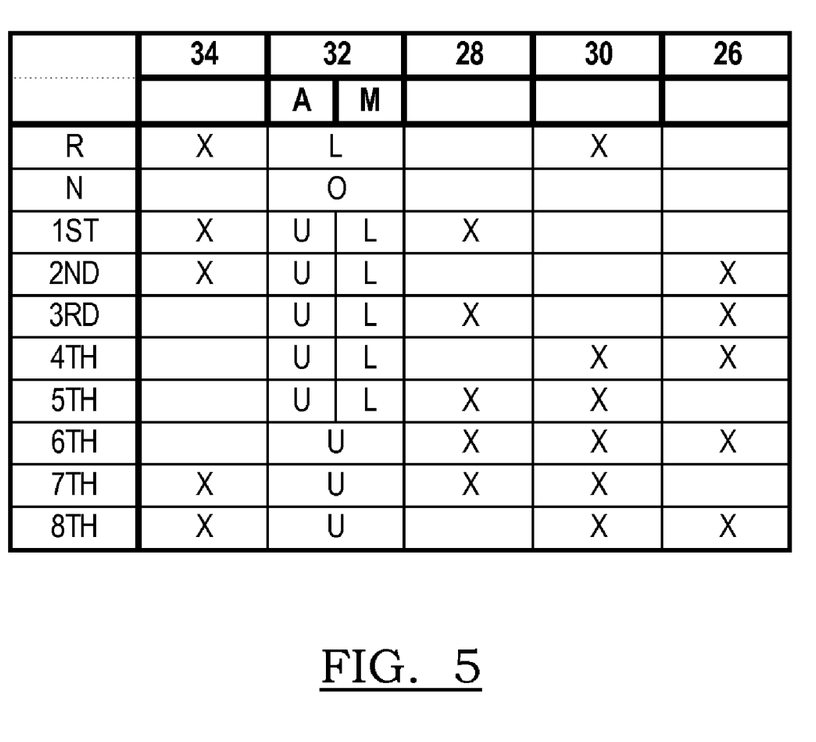
FIG. 5 is a truth table listing the engaged torque-transmitting mechanisms for selected torque ratios achieved by the transmission of FIG. 2.

FIG. 5 is a truth table presenting the various combinations of torque transmitting mechanisms that are activated or engaged X to achieve the various gear states. The transmission 10 has two operating modes, an automatic mode A and a manual mode M. In automatic mode A, the transmission 10 is operated such that the selectable one-way clutch 32 is deactivated or in the locked position L when in reverse gear state R and activated or in the unlocked position U when in first through eighth gear state $1^{st}$-$8^{th}$. When the transmission 10 is engaged in sixth through eighth gear state $6^{th}$-$8^{th}$, the selectable one-way clutch operates 32 in glide or overrun mode. Referring now to FIG. 3, in glide mode the output disc 62 spins in a glide rotation direction depicted by an arrow labeled with reference letter G, which is the same direction as the first rotary direction R1. Glide mode allows for drag losses that are significantly less than experienced with a traditional clutch mechanism. It should be noted that while FIG. 5 shows the locked position L and the unlocked position U illustrated in FIGS. 3-4, it is understood that the selectable one-way clutch 32 may use different mode selections as well. For example, in another embodiment, the selectable one-way clutch 32 could include an unlocked position where the forward locking mechanism 66 does not engage with one of the recesses 76 of the output member 62, while the reverse locking mechanism 68 engages with the corresponding recess 76 in the output member (FIGS. 3-4).

While operating the transmission 10 in manual mode M, the selectable one-way clutch is deactivated or in locked position L in reverse gear state R and in first through fifth gear state $1^{st}$-$5^{th}$. The manual mode M allows the ability of the operator to utilize engine braking as the selectable one-way clutch 32 effectively acts as a solid interconnecting member and does not allow the output disc 62 to rotate relative to the input disc 60 (FIG. 2). The selectable one-way clutch 32 (FIG. 2) is activated or in the unlocked position U in sixth through eighth gear state $6^{th}$-$8^{th}$ to allow for glide mode as stated above in automatic mode A.

Referring now to FIGS. 2 and 5, the operation of the example of the eight speed transmission 10 will be described. It will be appreciated that the transmission 10 is capable of transmitting torque from the input shaft or member 12 to the output shaft or member 22 in at least eight forward speed states or torque ratios and at least one reverse speed state or torque ratio. Each forward and reverse speed state or torque ratio is attained by engagement of one or more of the torque transmitting mechanisms (i.e. clutches 26, 28, 30, the selectable one-way clutch 32, and the brake 34), as will be explained below.

For example, to establish reverse gear state R in automatic mode A or manual mode M, the selectable one-way clutch 32 is in the locked position L, and the brake 34 and clutch 30 are both engaged or activated X. The selectable one-way clutch 32 in locked mode L connects the eighth interconnecting member 56 to ground or the transmission housing 40. The brake 34 connects the first interconnecting member 42 to the ground or the transmission housing 40. The clutch 30 connects the fourth interconnecting member 48 to the sixth interconnecting member 52.

For example, to establish the first gear state $1^{st}$ in automatic mode the selectable one-way clutch 32 is in the unlocked position U, and the brake 34 and the clutch 28 are both engaged or activated X. The selectable one-way clutch 32 in the unlocked position U operates as a traditional one-way clutch to connect the eighth interconnecting member 56 to ground or the transmission housing 40. The brake 34 connects the first interconnecting member 42 to the ground or the transmission housing 40. The clutch 28 connects the input member 12 to the fifth interconnecting member 50. In the embodiment as shown in FIG. 5, the selectable one-way clutch 32 is in the unlocked position U when the transmission 10 is operating in the automatic mode A and engaged in any of the forward speed ratios.

For example, to establish the first gear state $1^{st}$ in manual mode the selectable one-way clutch 32 is in the locked position L, and the brake 34 and the clutch 28 are both engaged or activated X. The selectable one-way clutch 32 in the unlocked position U operates to connect and prevent relative rotation between the eighth interconnecting member 56 and the transmission housing 40. The brake 34 connects the first interconnecting member 42 to the ground or the transmission housing 40. The clutch 28 connects the input member 12 to the fifth interconnecting member 50. In the embodiment as shown in FIG. 5, the selectable one-way clutch 32 is in the locked position L when the transmission 10 is operating in the manual mode M and is engaged in one of the first, second, third, fourth, or fifth speed ratios.

To establish sixth gear state $6^{th}$ in automatic mode A or manual mode M, the selectable one-way clutch 32 is in the unlocked position U and the clutches 26, 28, 30 are engaged or activated X. The selectable one-way clutch 32 in unlocked mode U acts as a traditional one-way clutch between the between the eighth interconnecting member 56 and the transmission housing 40. The first clutch 26 connects the third interconnecting member to the fifth interconnecting member 50. The second clutch 28 connects the input member 12 to the fifth interconnecting member 50. The third clutch 30 connects the fourth interconnecting member 48 to the sixth interconnecting member 52. Likewise, the eight forward speed states are achieved through different combinations of selectable one-way clutch, clutch and brake mode and engagement, as shown in FIG. 5.

Employing a selectable one-way clutch 32 typically improves fuel economy of a vehicle and reduces parts and complexity of the transmission. This is because a selectable one-way clutch has a lower amount of spin loss when compared to some other types of clutches that are commonly used in transmissions such as, for example, a friction type clutch. Thus, when the transmission 10 is engaged in either the sixth, seventh, or eighth speed ratio the selectable one-way clutch 32 operates in glide or overrun mode, thereby resulting in improved fuel economy. Moreover, employing a selectable one-way clutch also allows for engine braking in the manual mode M as well as gliding in the automatic mode A, without the need for additional components.

The description of the invention is merely exemplary in nature and variations that do not depart from the gist of the invention are intended to be within the scope of the invention. Such variations are not to be regarded as a departure from the spirit and scope of the invention.

What is claimed is:

1. A transmission having a housing with a front wall and a rear wall, the transmission comprising:
    an input member adjacent the front wall;
    an output member adjacent the rear wall;
    first, second, third and fourth planetary gear sets each having first, second and third members, wherein the second planetary gearset is adjacent the front wall, the fourth planetary gear set is adjacent the rear wall, the third planetary gear set is located between the second planetary gear set and the fourth planetary gear set, and the first planetary gear set is located between the third planetary gear set and the fourth planetary gear set;
    a first interconnecting member continuously interconnecting the first member of the first planetary gear set with the first member of the fourth planetary gear set;
    a second interconnecting member continuously interconnecting the third member of the first planetary gear set with the first member of the second planetary gear set;
    a third interconnecting member continuously interconnecting the third member of the second planetary gear set with the first member of the third planetary gear set;
    a fourth interconnecting member continuously interconnecting the third member of the third planetary gear set with the second member of the fourth planetary gear set; and
    five torque transmitting mechanisms each selectively engageable to interconnect at least one of the first, second, and third members with at least one other of the first, second, third members, and a stationary element, and wherein the torque transmitting mechanisms are selectively engageable in combinations of at least three to establish at least eight forward speed ratios and at least one reverse speed ratio between the input member and the output member, and
        wherein a first of the five torque-transmitting mechanisms is a selectable one-way clutch engageable to interconnect the third member of the fourth planetary gear set with the stationary member.

2. The transmission of claim 1 wherein a second of the five torque transmitting mechanisms is selectively engageable to interconnect the first member of the second planetary gear set with at least one of the third member of the second planetary gear set and the first member of the third planetary gear set.

3. The transmission of claim 2 wherein a third of the five torque transmitting mechanisms is selectively engageable to interconnect at least one of the second member of the first planetary gear set and the input member with at least one of the third member of the second planetary gear set and the first member of the third planetary gear set.

4. The transmission of claim 3 wherein a fourth of the five torque transmitting mechanisms is selectively engageable to interconnect the second member of the second planetary gear set with the second member of the third planetary gear set.

5. The transmission of claim 4 wherein a fifth of the five torque transmitting mechanisms is selectively engageable to interconnect at least one of the first member of the fourth planetary gear set and the first member of the first planetary gear set with the stationary element.

6. The transmission of claim 1 wherein the input member is continuously interconnected with the second member of the first planetary gear set and wherein the output member is continuously interconnected with the second member of the third planetary gear set.

7. The transmission of claim 1 wherein the first members are sun gears, the second members are carrier members, and the third members are ring gears.

8. The transmission of claim 1 wherein the selectable one-way clutch includes four modes of operation.

9. The transmission of claim 1 wherein the transmission is operable in one of an automatic mode and a manual mode.

10. The transmission of claim 9 wherein the selectable one-way clutch is operable in each of a locked position and an unlocked position, the locked position prevents relative rotation between the third member of the fourth planetary gear set and the stationary member, and the unlocked position allows for relative rotation in a first rotary direction and prevents relative rotation in a second rotary direction between the third member of the fourth planetary gear set and the stationary member.

11. The transmission of claim 10 wherein the locked position is selected when the transmission is operating in at least one of the automatic and manual modes and is engaged in the reverse speed ratio and when the transmission is operating in manual mode and the transmission is engaged in one of the first, second, third, fourth and fifth speed ratios.

12. The transmission of claim 11 wherein the unlocked position is selected when the transmission is operating in automatic mode and the transmission is engaged in one of the eight forward speed ratios.

13. A transmission having a housing with a front wall and a rear wall, the transmission comprising:
    an input member adjacent the front wall;
    an output member adjacent the rear wall;
    first, second, third and fourth planetary gear sets each having first, second and third members, wherein the second planetary gearset is adjacent the front wall, the fourth planetary gear set is adjacent the rear wall, the third planetary gear set is located between the second planetary gear set and the fourth planetary gear set, and the first planetary gear set is located between the third planetary gear set and the fourth planetary gear set;
    a first interconnecting member continuously interconnecting the first member of the first planetary gear set with the first member of the fourth planetary gear set;
    a second interconnecting member continuously interconnecting the third member of the first planetary gear set with the first member of the second planetary gear set;
    a third interconnecting member continuously interconnecting the third member of the second planetary gear set with the first member of the third planetary gear set;
    a fourth interconnecting member continuously interconnecting the third member of the third planetary gear set with the second member of the fourth planetary gear set; and
    five torque transmitting mechanisms each selectively engageable to interconnect at least one of the first, second, and third members with at least one other of the first, second, third members, and a stationary element, and wherein the torque transmitting mechanisms are selectively engageable in combinations of at least three to establish at least eight forward speed ratios and at least one reverse speed ratio between the input member and the output member, and wherein the transmission is operable in one of an automatic mode and a manual mode, and wherein a first of the five torque-transmitting mechanisms is a selectable one-way clutch operable in each of a locked position and an unlocked position, the locked position prevents relative rotation between the third member of the fourth planetary gear set and the stationary member, and the unlocked position allows for relative rotation in a first rotary direction and prevents relative rotation in a second rotary direction between the third member of the fourth planetary gear set and the stationary member.

14. The transmission of claim 13 wherein a second of the five torque transmitting mechanisms is selectively engageable to interconnect the first member of the second planetary gear set with at least one of the third member of the second planetary gear set and the first member of the third planetary gear set, a third of the five torque transmitting mechanisms is selectively engageable to interconnect at least one of the second member of the first planetary gear set and the input member with at least one of the third member of the second planetary gear set and the first member of the third planetary gear set, a fourth of the five torque transmitting mechanisms is selectively engageable to interconnect the second member of the second planetary gear set with the second member of the third planetary gear set, and a fifth of the five torque transmitting mechanisms is selectively engageable to interconnect at least one of the first member of the fourth planetary gear set and the first member of the first planetary gear set with the stationary element.

15. The transmission of claim 13 wherein the first members are sun gears, the second members are carrier members, and the third members are ring gears.

16. The transmission of claim 13 wherein the stationary element is a transmission housing.

17. The transmission of claim 13 wherein the input member is continuously interconnected with the second member of the first planetary gear set and wherein the output member is continuously interconnected with the second member of the third planetary gear set.

18. The transmission of claim 13 wherein the locked position is selected when the transmission is operating in at least one of the automatic and manual modes and is engaged in the reverse speed ratio and when the transmission is operating in manual mode and the transmission is engaged in one of the first, second, third, fourth and fifth speed ratios.

19. The transmission of claim 13 wherein the unlocked position is selected when the transmission is operating in automatic mode and the transmission is engaged in one of the eight forward speed ratios.

20. A transmission having a housing with a front wall and a rear wall, the transmission comprising:
an input member adjacent the front wall;
an output member adjacent the rear wall;
first, second, third and fourth planetary gear sets each having first, second and third members, wherein the second planetary gearset is adjacent the front wall, the fourth planetary gear set is adjacent the rear wall, the third planetary gear set is located between the second planetary gear set and the fourth planetary gear set, and the first planetary gear set is located between the third planetary gear set and the fourth planetary gear set;
a first interconnecting member continuously interconnecting the first member of the first planetary gear set with the first member of the fourth planetary gear set;
a second interconnecting member continuously interconnecting the third member of the first planetary gear set with the first member of the second planetary gear set;
a third interconnecting member continuously interconnecting the third member of the second planetary gear set with the first member of the third planetary gear set;
a fourth interconnecting member continuously interconnecting the third member of the third planetary gear set with the second member of the fourth planetary gear set;
a first torque-transmitting mechanism that is a selectable one-way clutch having a locked position and an unlocked position, wherein the selectable one-way clutch is engageable to interconnect the third member of the fourth planetary gear set with a stationary member;
a second torque transmitting mechanism selectively engageable to interconnect the first member of the second planetary gear set with at least one of the third member of the second planetary gear set and the first member of the third planetary gear set;
a third torque-transmitting mechanism selectively engageable to interconnect at least one of the second member of the first planetary gear set and the input member with at least one of the third member of the second planetary gear set and the first member of the third planetary gear set;
a fourth torque-transmitting mechanism selectively engageable to interconnect the second member of the second planetary gear set with the second member of the third planetary gear set;
a fifth torque-transmitting mechanism selectively engageable to interconnect at least one of the first member of the fourth planetary gear set and the first member of the first planetary gear set with the stationary element;
wherein the torque transmitting mechanisms are selectively engageable in combinations of at least three to establish at least eight forward speed ratios and at least one reverse speed ratio between the input member and the output member, and
wherein the locked position of the selectable one-way clutch prevents relative rotation between the third member of the fourth planetary gear set and the stationary member, and the unlocked position allows for relative rotation in a first rotary direction and prevents relative rotation in a second rotary direction between the third member of the fourth planetary gear set and the stationary member,
wherein the transmission is operable in an automatic mode and a manual mode,
wherein the locked position is selected when the transmission is operating in at least one of the automatic and manual modes and is engaged in the reverse speed ratio and when the transmission is operating in manual mode and the transmission is engaged in one of the first, second, third, fourth and fifth speed ratios, and
wherein the unlocked position is selected when the transmission is operating in automatic mode and the transmission is engaged in one of the eight forward speed ratios.

* * * * *